United States Patent [19]

Dalquist, III et al.

[11] Patent Number: 4,763,567
[45] Date of Patent: Aug. 16, 1988

[54] STOVETOP CORN POPPER

[75] Inventors: H. David Dalquist, III; Douglas C. Jacobsen, both of Minnetonka; Jorgen A. Jorgensen, Bloomington; Douglas J. Kluge, Golden Valley; John N. Taylor, St. Louis Park, all of Minn.

[73] Assignee: Northland Aluminum Products, Inc., Minneapolis, Minn.

[21] Appl. No.: 142,714

[22] Filed: Jan. 11, 1988

[51] Int. Cl.⁴ .................................................. A23L 1/18
[52] U.S. Cl. .................................... 99/323.5; 99/348; 366/247; 366/248
[58] Field of Search .................. 99/323.5, 323.8, 323.4, 99/348, 357; 366/244, 245, 247, 248, 251; 219/436, 438

[56] References Cited
U.S. PATENT DOCUMENTS 2,505,967  5/1950  Humphrey .......................... 366/248
2,707,622  5/1955  Vance ................. 99/348 X
4,149,455  4/1979  Ross ..................... 99/323.5
4,429,624  2/1984  Linn ....................... 99/348

Primary Examiner—Timothy F. Simone
Attorney, Agent, or Firm—Orrin M. Haugen; Thomas J. Nikolai; Frederick W. Niebuhr

[57] ABSTRACT

A corn popper includes a vessel open at the top, and a removable top cover. A handle integral with the cover includes a pistol grip portion relatively remote from the vessel when the cover is attached. A stirring mechanism, supported for rotation about a vertical axis within the vessel when the cover is attached, rotates responsive to the squeezing of a trigger mounted slidably with respect to the pistol grip section of the handle. The means for driving the stirring mechanism include a drive gear angularly fixed on the stirring mechanism, and a pinion movable linearly into and out of driving engagement with the drive gear, and also rotatable, by virtue of an extension of the trigger.

14 Claims, 3 Drawing Sheets

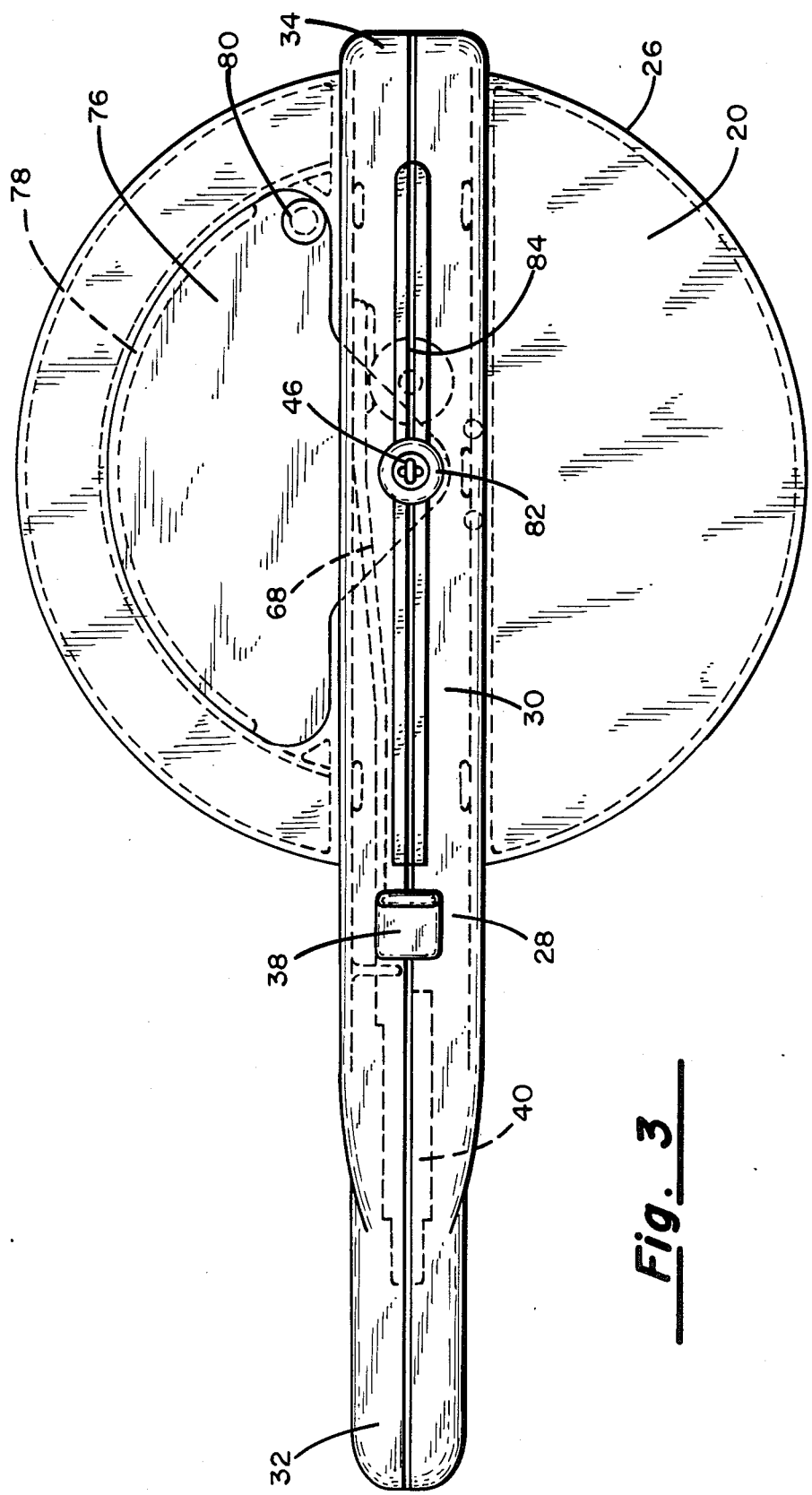

STOVETOP CORN POPPER

BACKGROUND OF THE INVENTION

This invention relates to apparatus for agitating and mixing food while it is being cooked, and more particularly to appliances for popping corn.

Such appliances are well known in the art, and have been the subject of U.S. patents. For example, U.S. Pat. No. 4,149,455 (Ross) shows a corn popper with an electrically heated base and a molded plastic film cover fitting into the base. A crank-operated shaft projects downwardly through the top of the cover, and is rotated during popping. Another crank-operated stirring rod is shown in U.S. Pat. No. 2,441,941 (Shafter).

Such poppers are satisfactory in the sense that they provide a means for agitating and mixing the popcorn kernels, as is necessary to more evenly distribute heat and to avoid burning and sticking of the kernels. At the same time, both designs require the use of two hands, with one hand positioned directly above the source of heat, such as an electrical heating element. These poppers, if used with a gas stove, would require an operator to hold one hand directly above the burner.

In order to position the operator's hand remotely of food being mixed or agitated, a remote handle and trigger may be employed, as shown in U.S. Pat. No. 2,007,249 (Kelley). The Kelley Patent discloses a pistol grip and trigger for moving egg beater blades in a ratcheted fashion. U.S. Pat. No. 2,353,132 (Frank) discloses a dispensing container with a thumb-operated lug 16 and a rack and pinion linkage for rotationally reciprocating a stirring member. Neither of these devices, however, is suitable for mixing and agitating food in a closed container while the food is being cooked.

Therefore, it is an object of the present invention to provide an appliance for stirring food being cooked in an enclosed container, operable with one hand at a location remote from the container.

Another object is to provide a simple, reliable ratchet connection for rotating a food stirring mechanism by reciprocating a trigger member.

Yet another object is to provide an apparatus for preparing popcorn including a vessel open at its top, and a removable cover for enclosing the vessel and for rotatably supporting a popcorn stirring mechanism, in which the means for fastening the cover and the means for rotating the stirring mechanism are proximate to one another.

SUMMARY OF THE INVENTION

To achieve these and other objects, there is provided an apparatus for preparing food including a vessel for containing food items. The vessel has a bottom and a generally cylindrical side wall extended generally upwardly from the periphery of the bottom and open at the top. The apparatus further includes a cover and means for removably and integrally fastening the cover to the vessel in order to close the vessel. A stirring member is mounted rotatably with respect to the cover and positioned in the vessel for rotation about a substantially vertical axis when the cover is fastened to the vessel. A handle, integral with the cover, includes a first section extended from the cover and configured to facilitate a gripping of the handle by hand closure about the first section. A trigger member is mounted along the first section to reciprocate with respect to the handle between forward and rearward trigger positions. A biasing means between the handle and the trigger member urges the trigger member forwardly. The trigger is movable rearwardly against the force of the biasing means through hand closure about the first section. A ratcheted drive means drivably engages the trigger member and the stirring member to rotate the stirring member responsive to rearward movement of the trigger member, and disengages the trigger from the stirring member when the trigger returns to the forward position under the force of the biasing means.

Preferably the side wall includes a generally horizontal flange at the top, and the handle has a second section engaging the cover and spanning its diameter. A hooked end of the handle, and a spring loaded latch pivotally mounted to the handle, can then cooperate to releasably engage opposed portions of the flange, thus to secure the cover. A contoured end of the latch can be located near the first handle section to facilitate thumb actuation by the user when gripping the first section.

The rotating stirring member preferably can slide vertically with respect to the cover, so that it occasionally can ride upwardly over popcorn kernels or other food items being mixed and agitated. The stirring member can be formed of a single elongate steel rod, including a vertical upper section and a triangular lower section that has two downwardly and radially outwardly inclined side legs, and a generally horizontal bottom leg. If desired, the bottom leg can be bent slightly at its center, so that the bottom leg center is slightly lower and rides upon the vessel bottom as the stirring member is rotated.

The ratcheted drive means can include a trigger extension integral with the trigger member and extended along the second handle section, a pinion between the cover and second handle section and mounted for rotation and limited linear movement relative to the cover, and a drive gear angularly fixed relative to the stirring member. The trigger extension is drivingly associated with the pinion in rack and pinion fashion, so that the pinion can either slide or move linearly as the trigger extension is reciprocated. The drive gear and pinion are mounted in proximate, spaced relation, so that rearward movement of the trigger member carries the pinion rearwardly into driving engagement with the drive gear. Further rearward trigger movement then rotates the pinion and drive gear, thus rotating the stirring member.

Thus in accordance with the present invention, popcorn or other food can be agitated and mixed while in a vessel placed upon a stovetop burner. The remote trigger enables convenient, one-hand operation of the stirring mechanism. By virtue of the latch location, the same hand can be used to secure the cover to the vessel and later remove it. The popcorn can be mixed without any lifting or shaking of the container, and with the operator's hand remote and safe from the source of heat. A sliding door formed in the cover facilitates the pouring of popped corn from the vessel, again requiring use of but one hand.

IN THE DRAWINGS

The above and other features and advantages are readily understood upon consideration of the following detailed description and drawings, in which:

FIG. 3 is a top view of the corn popper; and

DETAILED DESCRIPTION OF THE PREFERRED EMBODIMENT

Figure 1:
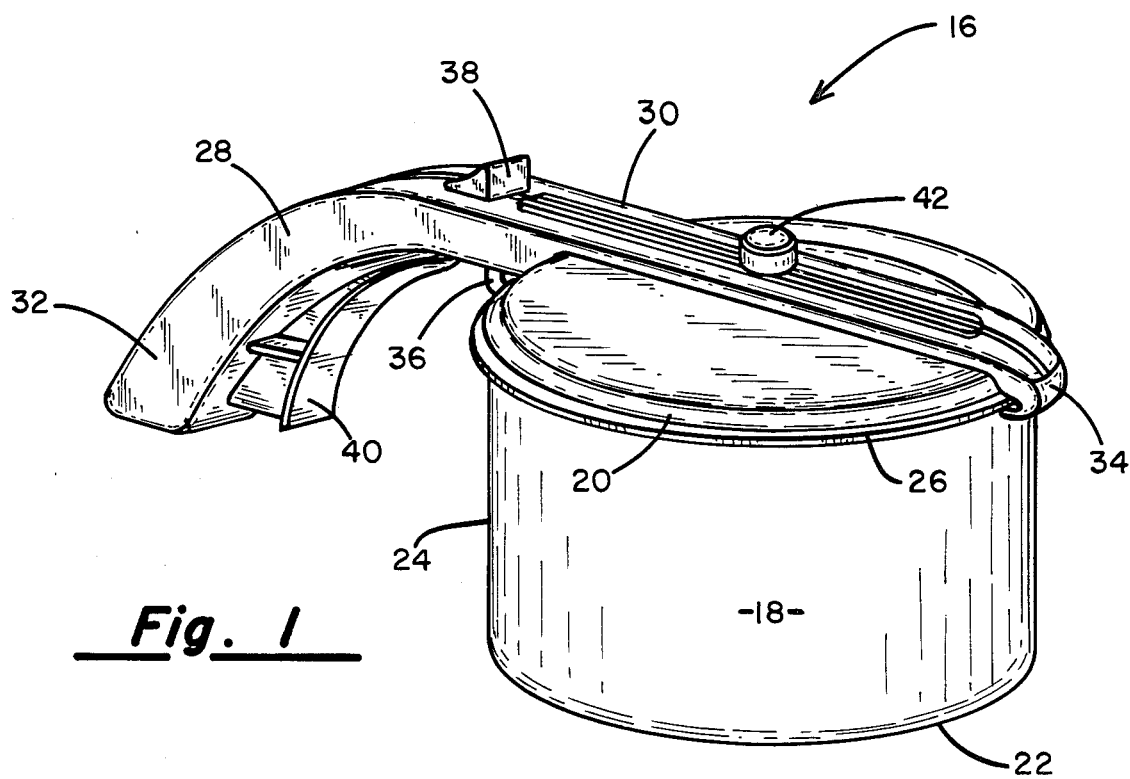
FIG. 1 is a perspective view of a stovetop corn popper constructed in accordance with the present invention.

Turning now to the drawings, there is shown in FIG. 1 a corn popper 16 including a vessel 18 for containing popcorn, and a top cover 20 removably fastened to the vessel. Vessel 18 is formed of aluminum, coated with silicone or other suitable material capable of withstanding heat at levels expected when corn popper 16 is used on burners of gas or electric stoves. Vessel 18 includes a substantially flat bottom 22, and an upright cylindrical side wall 24 extended upwardly from the bottom periphery. The vessel is open at the top for convenient loading of the popcorn when the cover is removed.

Cover 20 is constructed of a heat resistant thermoplastic which is preferably transparent (e.g. polycarbonate) to enable viewing of the popcorn during cooking. The cover is generally flat but has a rounded periphery, and includes a radially outwardly extended horizontal lip 26.

A handle 28, constructed of a phenolic resin, is attached to cover 26, particularly along a generally linear section 30 of the handle which spans the cover diameter. A pistol grip section 32 of the handle extends away from cover 20, and thus can be hand-held remotely from vessel 18 when the cover is secured. The pistol grip section is contoured to facilitate its gripping by one hand.

As shown at 34, linear handle section 30 is formed with a hooked end. At the opposite side of the cover is a latch 36, pivotally mounted with respect to handle 28 and including an enlarged top portion 38 contoured for operation by the thumb as the operator grips section 32 of the handle. A trigger 40, which can be formed of nylon, is positioned along a forward wall of handle grip section 32, and is reciprocable relative to the handle. A nylon cap 42 is located near the center of linear section 30.

Figure 2:
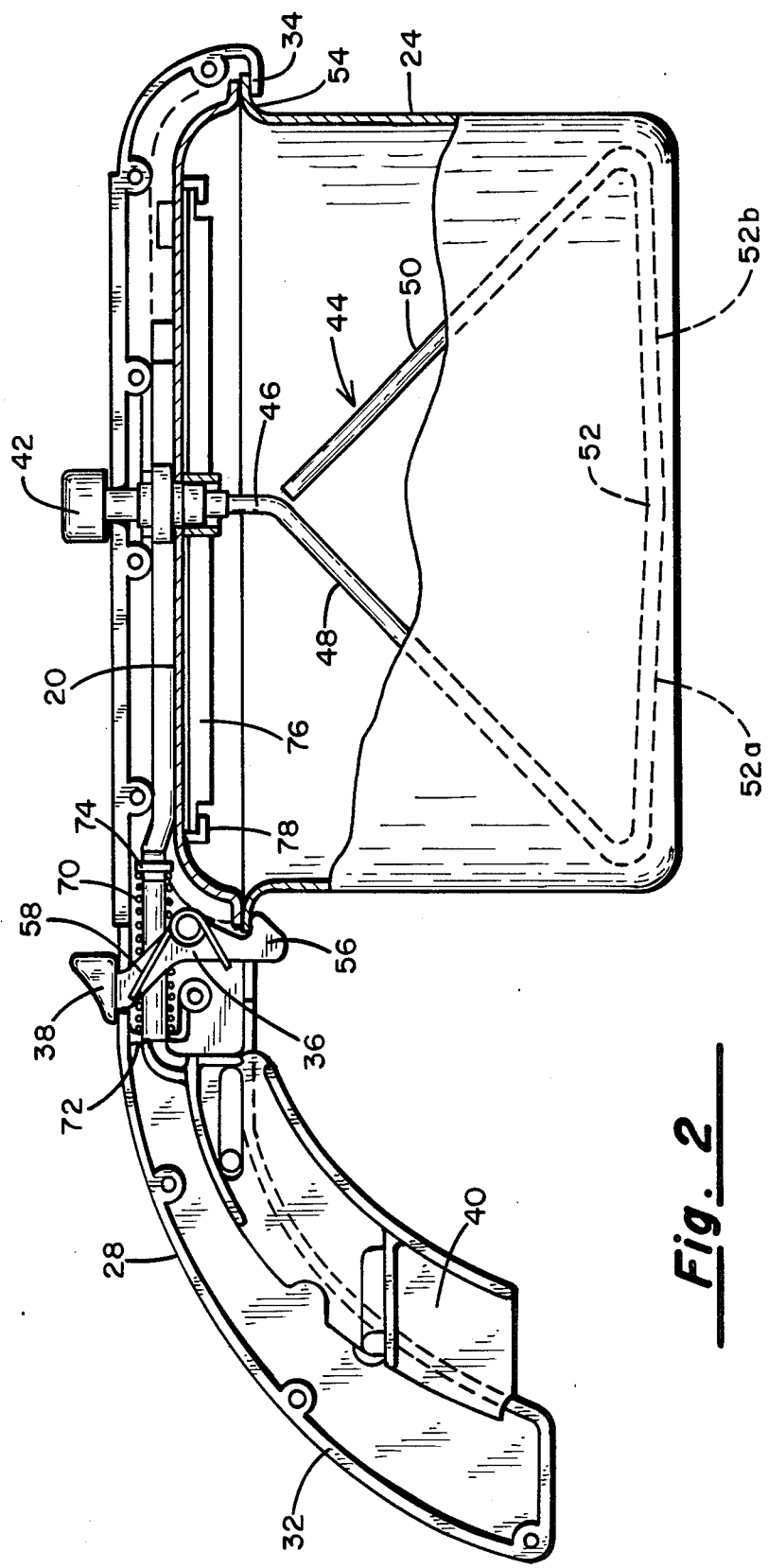
FIG. 2 is a side sectional view of the corn popper of FIG. 1.

As seen in FIG. 2, cap 42 is connected to a stirring mechanism 44 mounted rotatably with respect to cover 20 and linear handle section 30. When cover 20 is fastened to the vessel, the majority of the stirring mechanism is inside the vessel and the rotational axis is vertical. Stirring mechanism 44 preferably is formed by selectively bending an elongate steel rod to form a vertical upper section 46 joined to cap 42, and a triangular section which includes first and second legs 48 and 50 slanted downwardly and radially outward of the rotational axis, and a bottom leg 52. Bottom leg 52 is bent near its center, forming bottom leg sections 52a and 52b inclined slightly upward, about 2°, in the radially outward direction. This inclination, together with the fact that upper section 46 is slidably and rotatably supported in the cover and handle, results in bottom leg 52 being supported by vessel bottom 22 principally at the center, in line with the rotational axis. An advantage of this slidable mounting is that bottom leg 52 can move upwardly over a popcorn kernel or other obstruction, avoiding undue twisting or damage to the stirring mechanism.

Side wall 24 is bent outwardly at the top to form the substantially horizontal, radially outwardly directed flange 54. The flange and lip 26 are contiguous when the cover is fastened to the vessel. Hooked end 34 of the handle and a latching end 56 of latch 36 engage opposed portions of flange 54 as shown, thus to secure the handle and cover to the vessel and close the vessel. A latch spring 58 biases latch 36 to rotate counterclockwise as viewed in the figure, thus tending to maintain the latch in its locking position. The latch is pivoted clockwise to release the cover, simply by pushing enlarged end 38 forward with the thumb of the hand closed about handle section 32.

In FIG. 2, handle 28 is shown in section. Handle grip section 32 is hollow to receive trigger 40, which is slidable in forward and rearward directions, relative to the handle grip section, by virtue of slots 60 and 62 formed in the trigger and posts 64 and 66 formed in the handle, each post and handle interacting to control trigger movement. A nylon trigger extension 68 extends forwardly of trigger 40, and is contained inside of handle linear section 30 between the handle and cover 20. Surrounding a rearward portion of trigger extension 68 is a trigger spring 70. The trigger spring is a coil spring maintained in compression between a shelf 72 integral with the handle and a nylon spring retainer 74 fixed to the trigger extension, and thus continually urges the trigger and trigger extension in the forward direction.

A cover door 76 is supported against cover 20 by a track 78 depending downwardly from the cover. As seen in FIG. 3, a portion of cover door 76 surrounds upper section 46 of the stirring mechanism, whereby cover door 76 can rotate with respect to cover 20 about the vertical axis of rotation for the stirring mechanism. Of course, cover door 76 also is rotatable with respect to the stirring mechanism. A knob 80 mounted on cover door 76 permits convenient finger tip gripping for opening and closing the door by counterclockwise and clockwise rotation, respectively, as viewed in FIG. 3.

Mounted between handle section 30 and cover 20 is a ratchet drive means for rotating stirring mechanism 44 responsive to repetitive squeezing of trigger 40. As seen in FIGS. 2 and 3, the drive means includes a drive gear 82 angularly fixed relative to upper section 46 so that it rotates with the stirring mechanism, and a rotatable pinion 84 with a center shaft 86 and mounted near the drive gear. The most forward portion of trigger extension 68 is drivingly engaged with pinion 84. With the trigger in its forwardmost position as illustrated in FIGS. 2 and 3, drive gear 82 and pinion 84 are slightly spaced apart from one another.

Figure 4A:
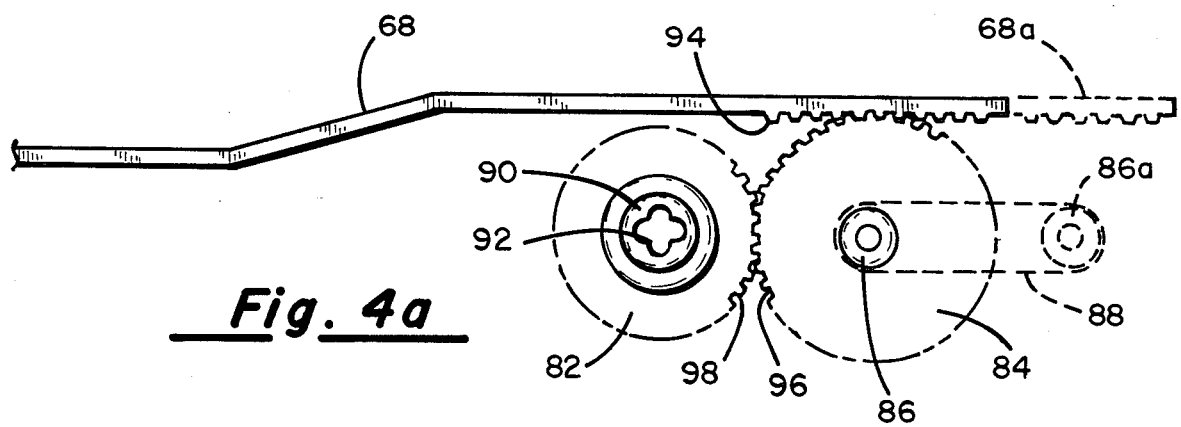
FIGS. 4a and 4b are respective top and side views of a stirring member drive mechanism of the corn popper.
Figure 4B:
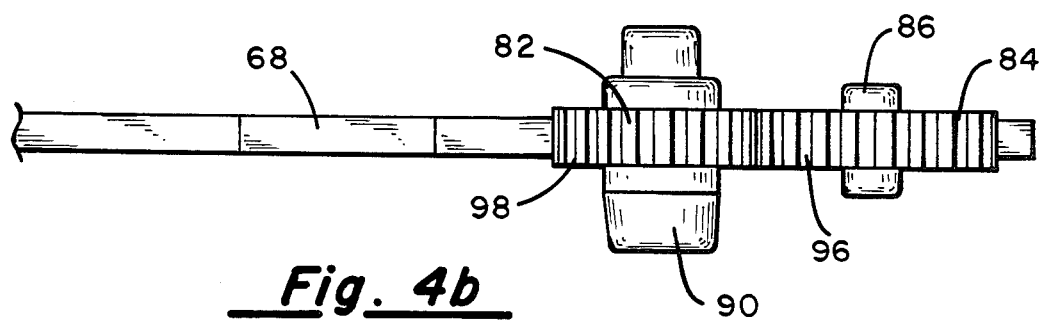

FIGS. 4a and 4b illustrate drive gear 82, pinion 84 and the forward portion of trigger extension 68, all in the position corresponding to the full retraction or rearward movement of trigger 40 relative to handle section 32. Broken lines at 68a and 86a in FIG. 4a illustrate the full forward positions of the forward end of trigger extension 68 and center shaft 86 of the pinion, respectively. Also represented in broken lines at 88, are two vertically aligned slots in handle section 30 and cover 20, respectively, for surrounding center shaft 86 in order to contain pinion 84. So mounted, the pinion is free not only for rotation with respect to the cover and handle, but also for limited linear movement in the longitudinal directions, i.e. forward and rearward. A central shaft 90 of drive gear 82 has an opening 92 therethrough, specifically shaped to allow vertical sliding of the drive gear with respect to upper section 46 of the stirring mechanism, but to fix the drive gear angularly with respect to the stirring mechanism. Consequently, rotating drive gear 82 causes the stirring mechanism to rotate as well.

Each oscillation of trigger 40 rotates stirring mechanism 44 as follows. Initially, trigger extension 68 and pinion 84 are in their forward positions as shown in FIGS. 2 and 3. A hand gripping of the trigger moves the trigger and trigger extension rearwardly against the force of trigger spring 70. The forward end of trigger extension 68 is provided with a series of teeth 94 drivingly engaged with pinion teeth 96 of pinion 84, so that rearward movement of the trigger extension moves the pinion as well. However, because of the low friction mounting of pinion 84 within the cover and handle slots represented at 88, the pinion does not rotate responsive to trigger movement, but rather slides rearwardly until center shaft 86 approaches the rearward end of the slots, corresponding to a driving engagement between pinion teeth 96 and drive teeth 98 of drive gear 82 as shown in FIGS. 4a and 4b. This driving engagement occurs well before a full retaction of trigger 40 into handle section 32. Accordingly, rearward trigger movement following the driving engagement rotates pinion 84 counterclockwise as viewed in FIG. 4, thus to rotate drive gear 82 and stirring mechanism 44 in the clockwise direction.

When the trigger is released, trigger extension 68 moves forward under the influence of trigger spring 70. Pinion 84 does not rotate in the clockwise direction, but rather slides forwardly in its mounting slots until center shaft 86 contacts the forward portion of the slots, whereupon the pinion is rotated clockwise by the continued forward return of the trigger and trigger extension.

The above-described cycle is repeated by the operator as frequently as desired in order to adequately mix and stir the corn as it is popped. Only one hand is required for popping the corn, specifically for gripping handle section 32, well removed from the stovetop burner or other source of heat for the popping corn. Also, due to the convenient location of enlarged end 38 of latch 36, cover 20 can be detached from vessel 18 by using the thumb of the same hand holding the trigger and handle. Also, because stirring mechanism 44 can slide vertically relative to the cover and handle, it tends to ride upwardly and over any obstruction (e.g. unpopped kernels), thus avoiding any damage to the mechanism itself or to the pinion and drive gear. Finally, if desired, cap 42 can be configured to fit over the upper end of upper section 46 by friction, so that it may be removed to free stirring mechanism 44 from the cover and handle, to facilitate assembly of the corn popper, and later removal of the stirring mechanism for convenient cleaning between uses of the corn popper.

What is claimed is:

1. An apparatus for preparing food, including:
   a vessel for containing food items, said vessel having a bottom and a generally cylindrical side wall extended generally upwardly from the periphery of the bottom and open at the top thereof;
   a cover and means for removably and integrally fastening the cover to the vessel to close the vessel;
   a stirring member mounted rotatably with respect to said cover and positioned in said vessel for rotation about a substantially vertical axis when the cover is fastened to the vessel;
   a handle integral with said cover and including a first section extended from the cover and configured to facilitate a gripping of said handle by hand closure about the first section;
   a trigger member mounted along said first section to reciprocate with respect to said handle between forward and rearward trigger positions, and a biasing means between said handle and said trigger member for urging said trigger member forwardly, said trigger member movable rearwardly against the force of said biasing means responsive to said hand closure; and
   a ratcheted drive means for drivably engaging said trigger member and said stirring member to rotate said stirring member responsive to rearward movement of the trigger member, and for disengaging the trigger from the stirring member when the trigger returns to the forward trigger position under the force of the biasing means.

2. The apparatus of claim 1 further including:
   a generally horizontal flange formed at the top of said side wall and extended radially outwardly thereof; said handle including a second section engaging said cover and spanning the cover diameter, and a hooked end formed in said handle; and a spring loaded latch pivotally mounted with respect to the handle; wherein said hooked end and latch releasably engage opposed portions of said flange to fasten said cover, said latch and hooked end together comprising said fastening means.

3. The apparatus of claim 2 wherein:
   said latch includes a contoured end located near said first section in a position to facilitate actuation of said latch with a thumb of a hand closed about said first section.

4. The apparatus of claim 1 wherein:
   said stirring member is mounted slidably with respect to said cover and is supported by said bottom when the cover is fastened to said vessel.

5. The apparatus of claim 4 wherein:
   said stirring member includes an upright upper section extended through said cover, and a triangular lower section including two downwardly and radially outwardly inclined side legs and a generally horizontal bottom leg between the side legs.

6. The apparatus of claim 5 wherein:
   said bottom leg is centered on said vertical axis, and is slightly upwardly inclined in the directions radially outward from its center.

7. The apparatus of claim 6 wherein:
   said upper and lower sections of said stirring member are formed by selectively bending an elongate rod.

8. The apparatus of claim 2 wherein:
   said ratcheted drive means includes a trigger extension integral with said trigger member and extended along said second section, a first gear between said cover and said second section, mounted to rotate relative thereto for limited forward and rearward linear movement with respect thereto, said first gear positioned in driving engagement with said trigger extension and moving linearly with said trigger extension responsive to reciprocal movement of said trigger member, and a second gear mounted rotatably with respect to said cover and said second section, and angularly fixed relative to rotate with said stirring member, and spaced apart from said first gear when said trigger is in said forward trigger position;
   said first gear, responsive to rearward movement of said trigger member, moving rearwardly with said trigger extension into driving engagement with said second gear, further rearward movement of said trigger extension rotating the first gear and thereby rotating said second gear and stirring member.

9. The apparatus of claim 8 wherein:
said biasing means comprises a spring in compression between a first retainer integral with said handle and a second retainer integral with said trigger extension.

10. A cooking appliance for preparing popcorn, including:
a vessel for containing popcorn, having a bottom and a generally cylindrical and upright side wall projected upwardly from the bottom;
a top cover, and means for removably and integrally fastening the top cover to said vessel to close the vessel;
a stirring member rotatably mounted with respect to said cover and positioned inside of said vessel for rotation about a substantially vertical axis when the cover is so fastened;
a handle member integral with said cover and including a cover reinforcing section spanning the cover diameter and in contact with the cover, and a handle section relatively remote from the cover and configured to facilitate a hand closure therearound;
a trigger member mounted along said handle section for reciprocating movement between forward and rearward trigger positions with respect to said handle section, and a biasing means between said handle and said trigger member for urging said trigger member toward said forward trigger position; and
a ratchet drive means for drivingly associating said trigger member and said stirring member to rotate the stirring member on said vertical axis responsive to rearward movement of said trigger member, and for disengaging said trigger member and said stirring member responsive to forward movement of said trigger.

11. The cooking appliance of claim 10 wherein:
said stirring member is formed of an elongate rod by selectively bending said rod to provide an upright top section slidably and rotatably mounted with respect to said cover, and a triangular lower section including first and second downwardly and radially outwardly extended legs, and a generally horizontal bottom leg joining the bottom ends of the side legs.

12. The cooking appliance of claim 11 wherein:
said bottom leg is slightly bent at its center to form two bottom leg portions of substantially equal length, each said leg portion upwardly inclined in the direction away from the center of said bottom leg at an angle of about 2°.

13. The cooking appliance of claim 10 wherein:
said ratchet drive means includes a trigger extension integral with said trigger member and contained between said cover and said cover reinforcing extension; a clutch gear including a central vertical stem supported in upper and lower slots provided in said reinforcing section and said cover, respectively, and in a rack and pinion driving engagement with said trigger extension, whereby said clutch gear is rotatable relative to said cover and handle, and is movable linearly with said trigger extension in said slots; and a drive gear angularly fixed relative to said stirring member including a central upright stem rotatably supported in said cover and reinforcing section and proximate said clutch gear;
wherein rearward movement of said trigger member moves said clutch gear toward and into driving engagement with said drive gear, with continued rearward movement of said trigger member after said engagement causing said trigger extension to rotate said clutch gear, said drive gear, and said stirring member; and wherein forward movement of said trigger member causes the trigger extension to move said clutch gear linearly away from said clutch gear to disengage said gears.

14. The cooking appliance of claim 10 further including:
an opening in said top cover, a door mounted slidably with respect to said top cover, and means mounted on said door for facilitating hand movement of the door to alternatively open and close said opening.

* * * * *